Aug. 30, 1938. N. P. BACH 2,128,227
MACHINE FOR TREATING FILLED CONTAINERS
Filed Feb. 18, 1935 8 Sheets-Sheet 1
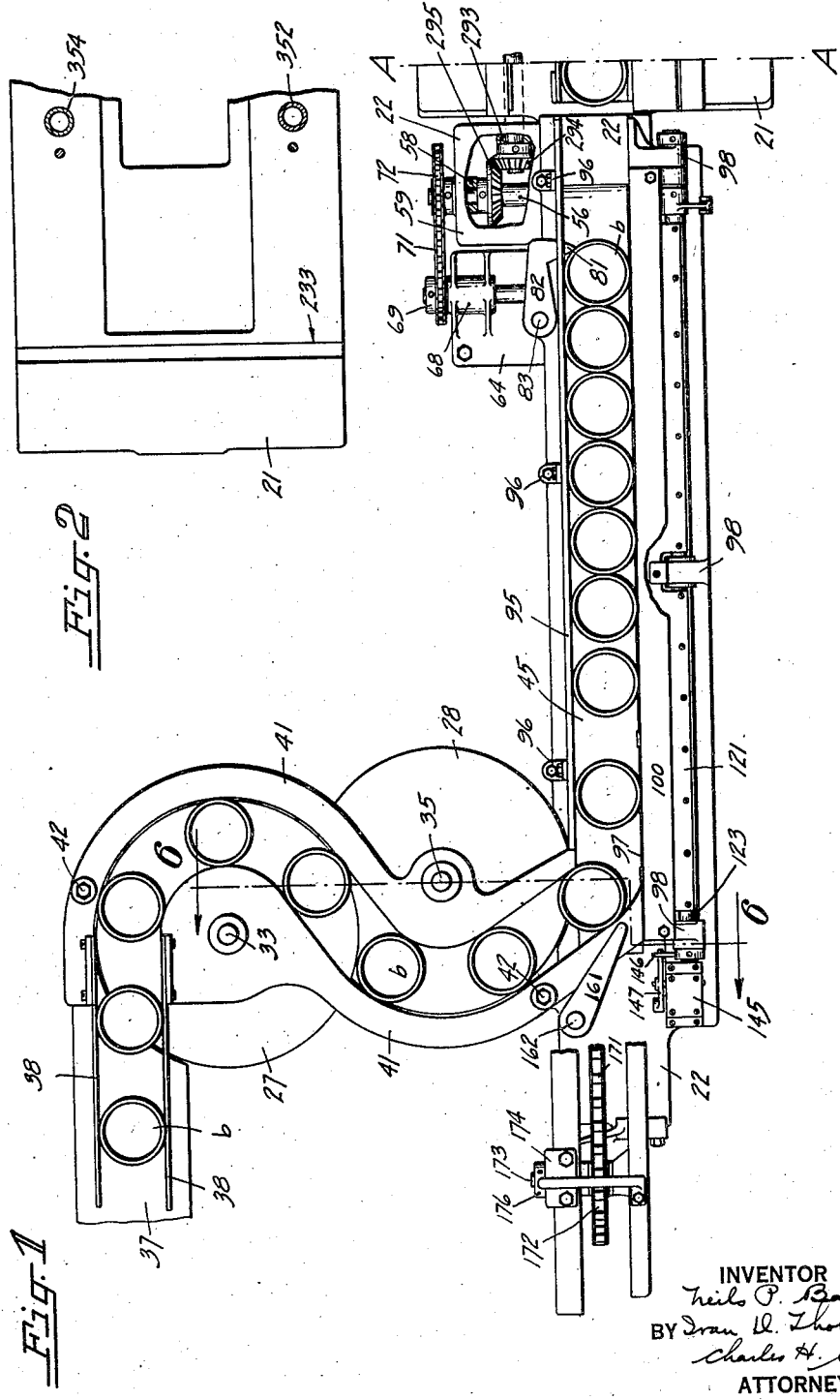
INVENTOR
Neils P. Bach
BY Ivan D. Thornburgh
Charles H. Crael
ATTORNEYS

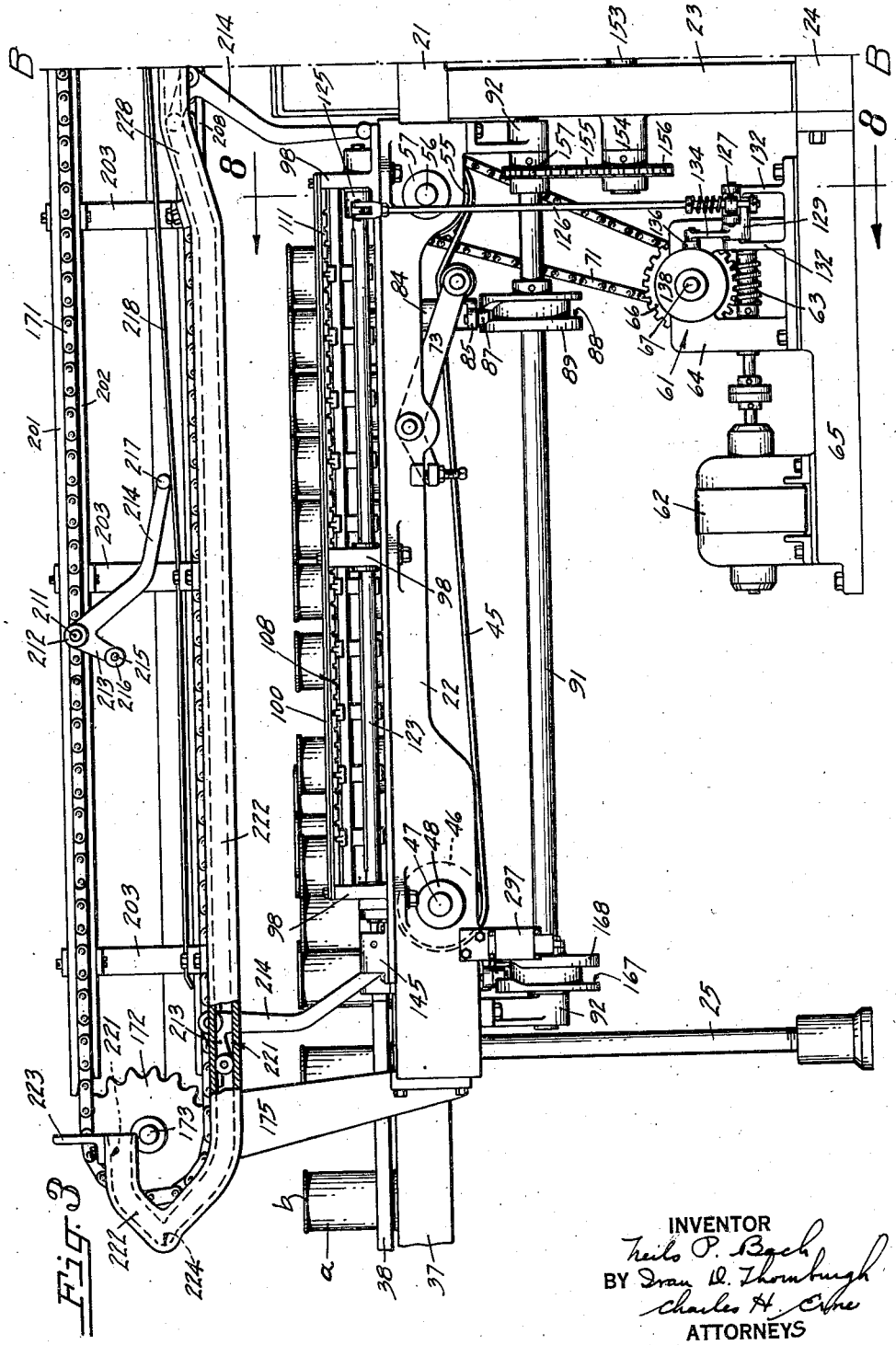

Aug. 30, 1938.   N. P. BACH   2,128,227
MACHINE FOR TREATING FILLED CONTAINERS
Filed Feb. 18, 1935   8 Sheets-Sheet 3
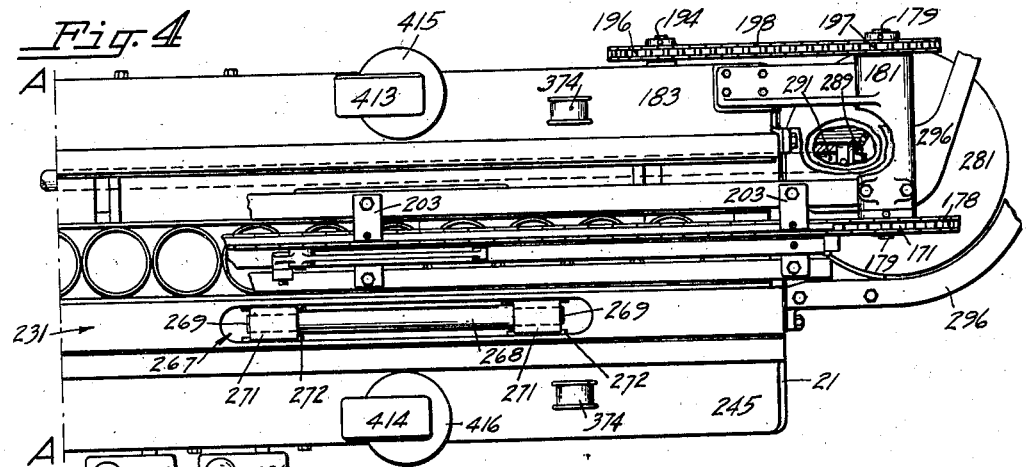
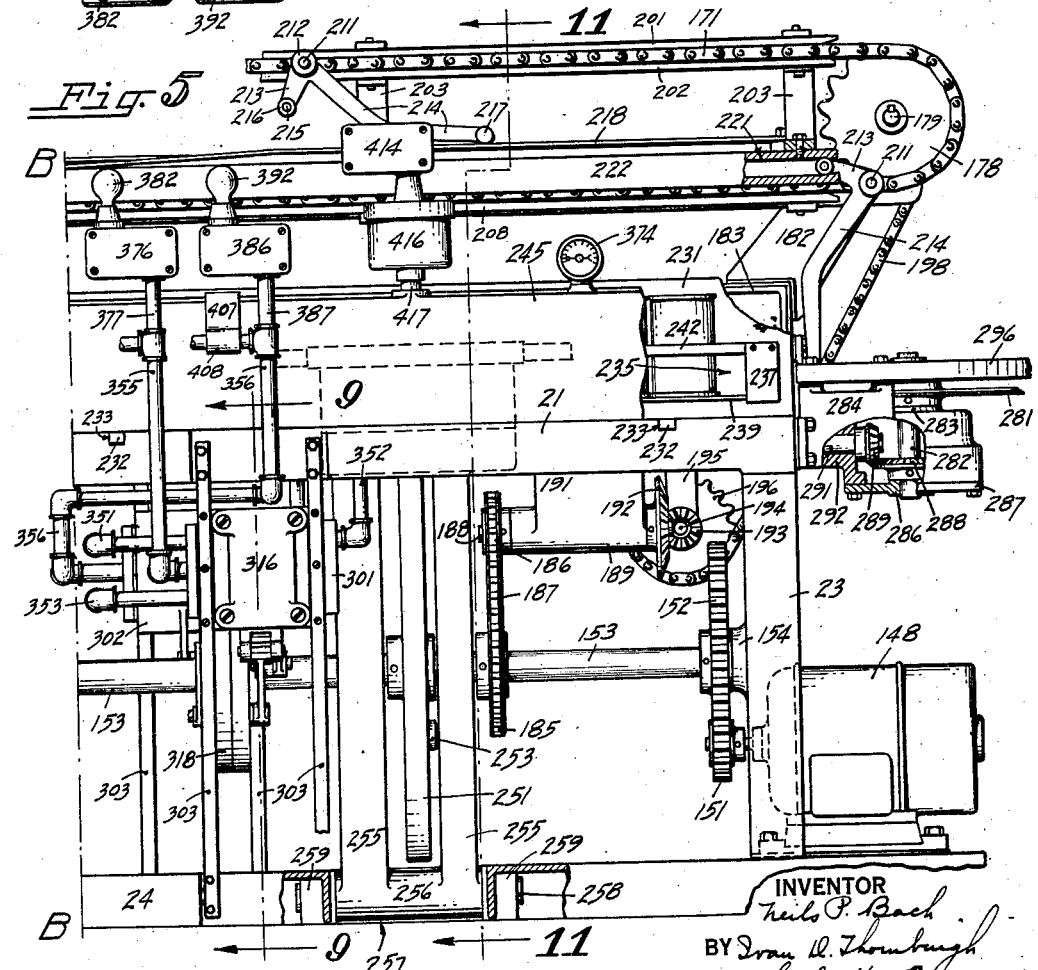

Aug. 30, 1938.  N. P. BACH  2,128,227
MACHINE FOR TREATING FILLED CONTAINERS
Filed Feb. 18, 1935   8 Sheets-Sheet 4
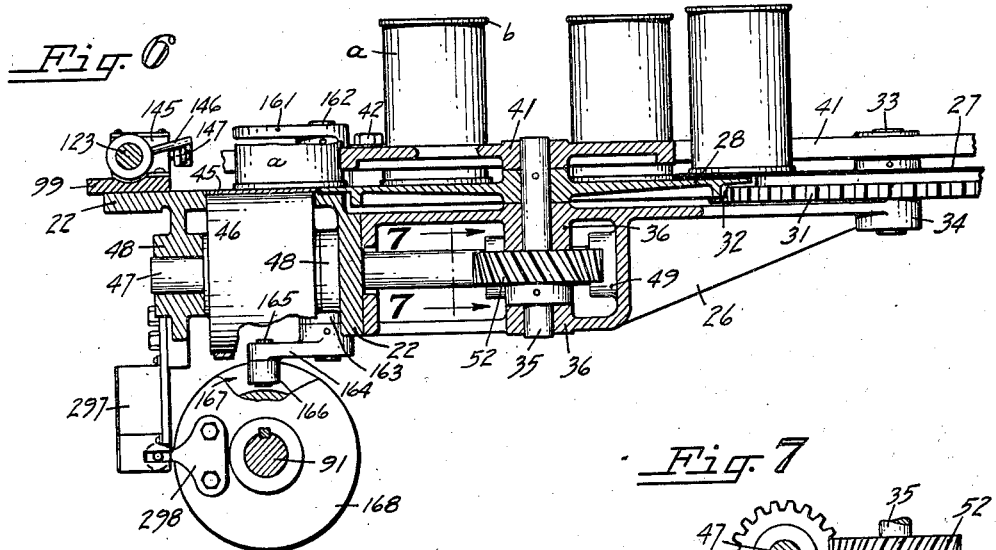
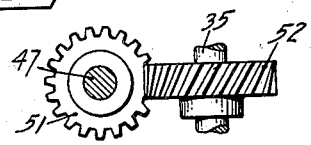
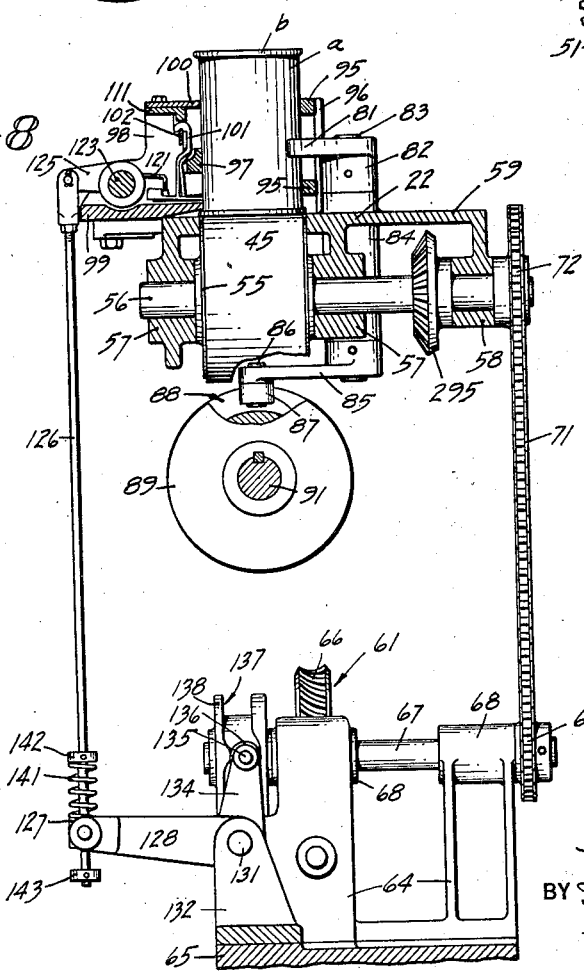
INVENTOR
Neils P. Bach
BY Ivan D. Thornburgh
Charles H. Erbe
ATTORNEYS

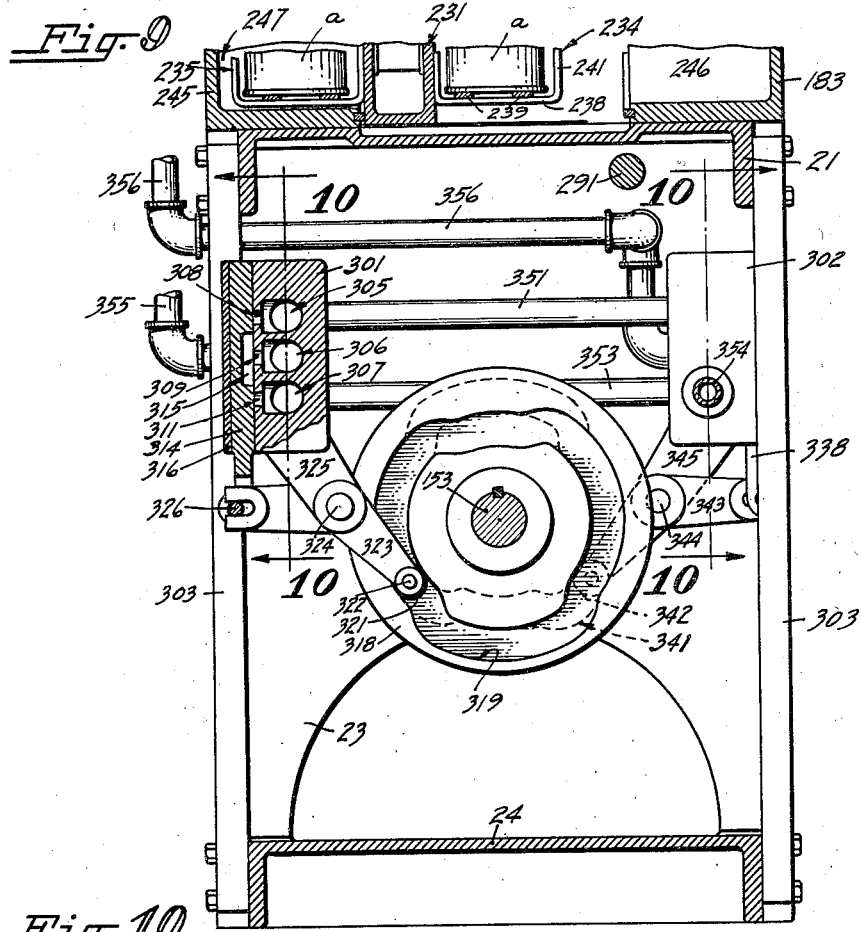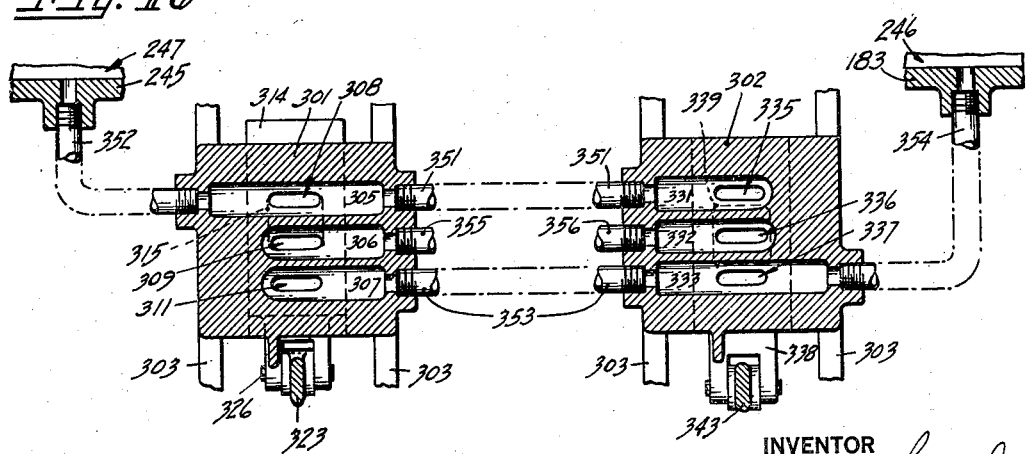

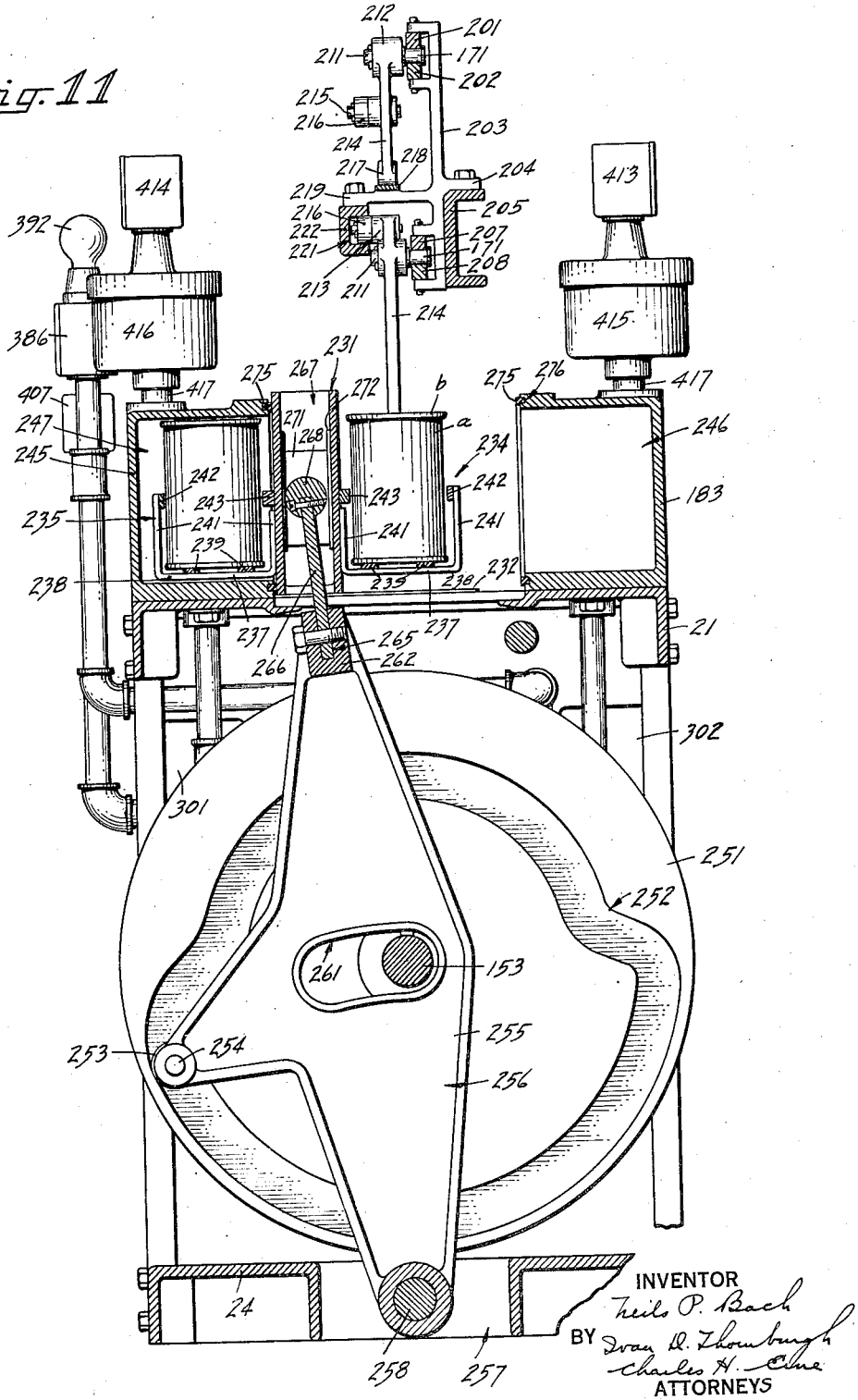

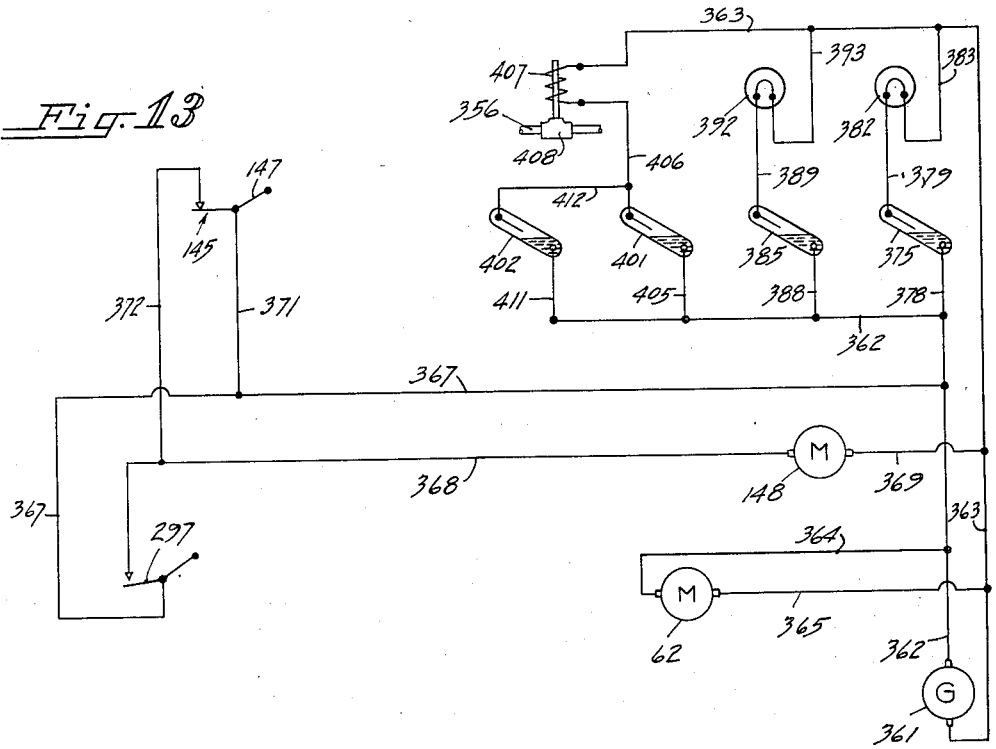
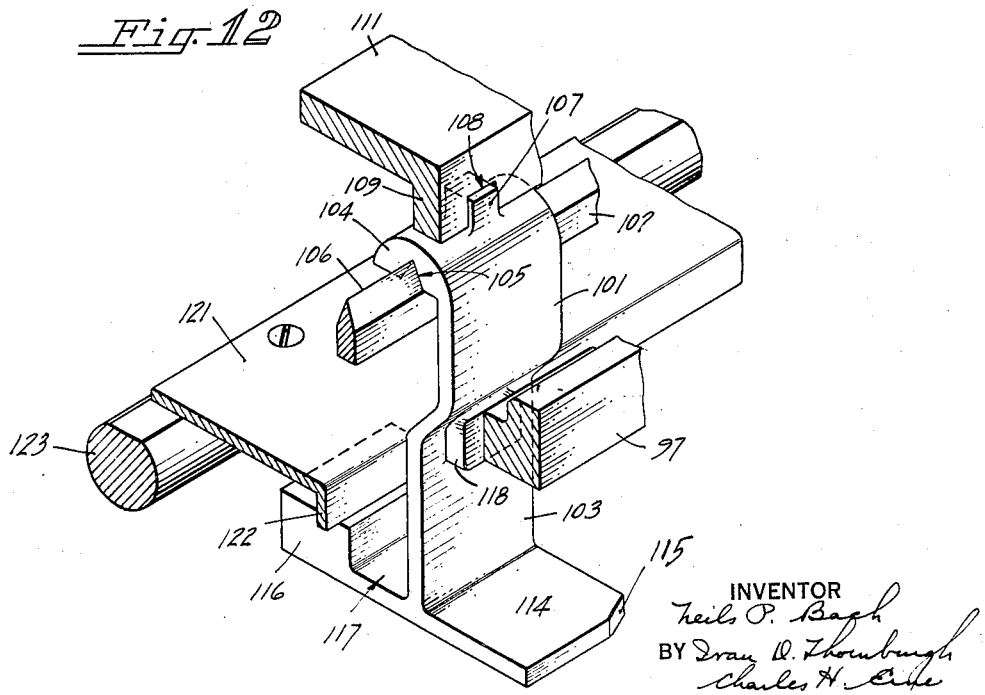

Aug. 30, 1938.　　　　N. P. BACH　　　　2,128,227
MACHINE FOR TREATING FILLED CONTAINERS
Filed Feb. 18, 1935　　　8 Sheets-Sheet 8

INVENTOR.
Neils P. Bach
BY Ivan D. Thornburgh
Charles H. Cyrus
ATTORNEYS

Patented Aug. 30, 1938

2,128,227

UNITED STATES PATENT OFFICE 2,128,227

MACHINE FOR TREATING FILLED CONTAINERS

Neils P. Bach, Geneva, N. Y., assignor to American Can Company, New York, N. Y., a corporation of New Jersey Application February 18, 1935, Serial No. 7,140

18 Claims. (Cl. 226—68)

The present invention relates to a machine for treating filled containers and has particular reference to devices for collecting the containers into groups and for transferring the groups into predetermined position within the machine for treating operations, the performance of the transferring operation for each group being effected automatically when and as each group is completely formed.

An object of the invention is to provide a machine for treating filled containers wherein individual containers as they are received are collected into groups each of a predetermined number of containers which are transferred into closed chambers for a treating operation and wherein the transfer of each group is automatically effected when and after it is completely formed.

Another object is to provide such a machine for vacuumizing and gassing containers wherein the operation of the group transferring and the vacuumizing and gassing mechanisms are controlled by the container collecting devices, the operations of these mechanisms being prevented until the required number of containers are collected in a group.

Another object is to provide such a machine wherein the completion of a group of containers automatically cuts off the feeding of subsequent incoming containers and then follows the segregation of the group just formed and its further transfer into another part of the machine.

Another object is to provide such a machine which is double acting in that one group of containers is vacuumized and gassed in a chamber while another group is being collected ready for transfer into another chamber, the chambers when supplied with containers being alternately brought into communication with interconnected vacuumizing and gassing devices.

Another object to is to provide devices for automatically controlling the gas pressure in the chambers so that the gassing of each group of containers may be rapid and efficient and yet economical.

Numerous other objects and advantages of the invention will be apparent as it is better understood from the following description, which, taken in connection with the accompanying drawings, discloses a preferred embodiment thereof.

Referring to the drawings:

Figure 1 is a plan view of part of a machine embodying the instant invention, parts being broken away;

Fig. 2 is an enlarged fragmentary plan view of the frame part of the machine shown in the extreme right hand end of Fig. 1, parts being removed;

Fig. 3 is a side elevation of the part of the machine illustrated in Fig. 1, parts being broken away;

Fig. 4 is a continuing plan view of the machine of Fig. 1, the two views when joined along the lines A—A in both figures illustrating the complete plan view of the entire machine, parts being broken away;

Fig. 5 is a continuing side elevation of the machine of Fig. 3, the two views when joined along the lines B—B in both figures illustrating the complete side elevation of the entire machine, parts being broken away;

Fig. 6 is an enlarged transverse sectional view taken substantially along the broken line 6—6 in Fig. 1;

Fig. 7 is a sectional detail viewed substantially along the line 7—7 in Fig. 6, parts being broken away;

Fig. 8 is an enlarged transverse sectional view taken substantially along the line 8—8 in Fig. 3, with parts broken away;

Fig. 9 is an enlarged transverse sectional view of the lower part of the machine, taken substantially along the line 9—9 in Fig. 5, parts being broken away;

Fig. 10 is a fragmentary sectional composite view of the two different parts of the valve mechanism of the machine as taken substantially along the two spaced section lines 10—10 in Fig. 9, the two sections being laid over and schematically associated to better show the valve operation;

Fig. 11 is an enlarged transverse sectional view taken substantially along the broken line 11—11 in Fig. 5, with parts broken away;

Fig. 12 is an enlarged perspective view of a part of the container detecting mechanism shown in the upper left hand corner of Fig. 8;

Fig. 13 is a wiring diagram of the electrical controls associated with the machine;

Figure 16:
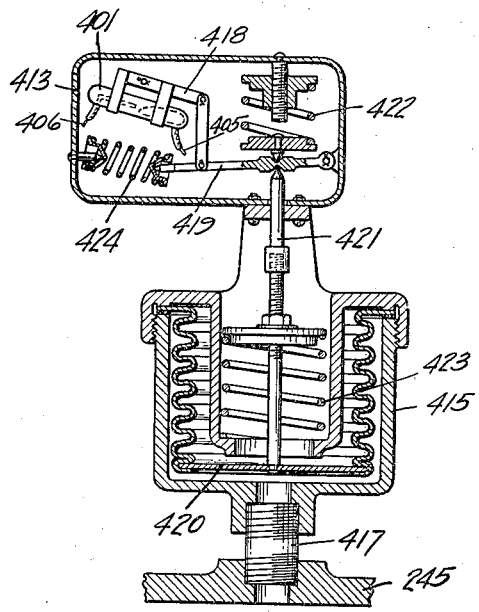
Fig. 16 is a sectional view of another gas switch unit as viewed along the section line 16—16 in Fig. 14.

In the illustrated embodiment of the invention, filled containers or cans which preferably have a cover loosely applied thereon are introduced into the machine in a continuous procession from a runway which may be associated with a filling machine or the like. The cans are received from this runway on rotating discs which transfer them individually to a continuously moving belt conveyor by which they are advanced toward the vacuumizing and gassing or other treating end of the machine. Before reaching this end of the machine, however, the cans are collected into a group containing a predetermined number of cans. This grouping is effected by a can holding instrumentality located near the end of the belt conveyor.

The foremost can in the procession when it engages the holding device is stopped or held stationary while the belt slips beneath it. The next following can on the conveyor thereupon moves into engagement with the held can and subsequent cans in the line stack up or collect in close order one behind the other. The cans are automatically and individually detected as they come to position in the line and when the desired number has been collected the detecting device automatically stops the transfer of following cans from the feed-in discs to the belt conveyor. Simultaneously with this action the group of cans on the conveyor is released by the removal of the holding instrumentality from the path of the cans.

This action of the detecting device also sets into motion other devices associated with the vacuumizing and gassing mechanism. The latter includes an overhead conveyor which now engages and moves the group of collected cans forward as a unit. These segregated cans are brought into one side or back of a duplex transversely movable can holding cradle disposed between a pair of opposed chambers forming a part of the can vacuumizing and gassing mechanism.

As soon as the group of cans is fully positioned in the cradle, the holding instrumentality associated with the conveyor is again restored to holding position and the cans on the "feed in" discs again pass to the conveyor and accumulate thereon. While a second group of cans is thus being collected the first group in the can cradle is moved transversely of the machine and positioned into one of the chambers. This chamber is immediately closed and sealed by a wall forming a part of the cradle.

A valve unit actuated by the vacuumizing and gassing mechanism now acts to first establish a line of communication between the closed chamber and a source of vacuum whereupon the chamber and the cans therein are vacuumized and second, to cut off the vacuum and introduce an inert gas into the chamber and into the cans. A valve unit of this character is described in Patent No. 1,841,326 granted January 12, 1932, to Lewis W. Eggleston, is suitable for this purpose and is not itself claimed by me. When a predetermined degree of gas pressure has been reached in the chamber the pressure so developed automatically cuts off the gas supply and the cans are then ready to be discharged from the chamber and from the machine.

The gassed cans remain in the chamber until the succeeding group is fully collected or segregated and is positioned into the opposite or empty side of the cradle. The cradle is then shifted back to its former position and this moves the second group of cans into the opposite chamber and in place for their subsequent vacuumizing and gassing. In this return movement of the cradle, the first group of gassed cans is withdrawn from its chamber. These cans are now engaged by the overhead conveyor which pushes them longitudinally out of the cradle and onto a discharge disc which removes the cans from the machine. Ordinarily this disc will be associated with a suitable closing machine or the like for sealing the covers onto the cans.

A preferred form of machine is disclosed in the drawings and comprises a main frame 21 (Figs. 1, 3, 4 and 5) which carries the vacuumizing and gassing mechanism and an auxiliary frame 22 which supports the can feeding and can collecting devices. The main frame is supported on leg members 23 which are mounted on a base 24. One end of the auxiliary frame is supported on the main frame and its opposite end is mounted on an adjustable standard 25 which rests on the floor. It is adjacent this end of the frame that filled cans $a$ carrying loosely applied covers $b$ are introduced into the machine in a vertical position and on a feeding device carried in a housing bracket 26 (Fig. 6) secured in a position substantially at right angles and to one side of the auxiliary frame 22.

The feeding device comprises a pair of horizontal overlapping discs 27, 28 which are continuously rotated in opposite directions and in unison by intermeshing gears 31, 32 (Fig. 6) formed at the bottom of the respective discs. Disc 27 is mounted on a short vertical shaft 33 which is carried in a bearing 34 formed in the outer end of the bracket 26. Disc 28 is mounted between the auxiliary frame and the disc 27 on a vertical shaft 35 which is carried in bearings 36 also formed in the bracket 26.

Cans entering the machine are received from a runway 37 (Figs. 1 and 3) having spaced parallel guide bars 38 which deliver the cans onto the disc 27 positioning them between a pair of spaced parallel curved guide rails 41. These latter rails are arranged over the tops of both discs, being carried on the upper ends of the shafts 33, 35, one end of each rail being secured by a bolt 42 to the top of the bracket 26. The discs advance the cans between the guide rails through a circuitous path, transferring them from disc 27 to disc 28 and thence onto an endless belt conveyor 45.

The belt conveyor 45 is carried in the auxiliary frame 22 and moves longitudinally thereof with the top surface of the upper run of the belt flush with the top surface of the frame. At the can feed-in end of the frame, the belt takes over pulley 46 (Figs. 3 and 6) which is mounted on and secured to a horizontal shaft 47 journaled in a pair of bearings 48 formed in the sides of the auxiliary frame and also in a bearing 49 formed in the bracket 26. It is this shaft 47 that drives the feed discs 27, 28. This is effected by helical gears between the shafts 47, 35 (Fig. 7) one being a gear 51 carried on the shaft 47 which meshes with a similar gear 52 mounted on and secured to the vertical shaft 35. The discs are thus rotated by and in time with the belt conveyor.

At the opposite end of the auxiliary frame 22, i. e., the end adjacent the main frame 21, the conveyor belt takes over a driving pulley 55 (Figs. 3 and 8). Pulley 55 is mounted on a horizontal shaft 56 (see also Fig. 1) which is journaled in a pair of bearings 57 formed in the sides of the auxiliary frame and also in a bearing 58 formed in a gear casing extension 59 of the frame. This shaft 56 is continuously driven from a speed reduction unit 61 which is connected with and driven by any suitable source of power such as for example an electric motor 62.

The driven element of the reduction unit 61 comprises a worm 63 (Fig. 3) which is suitably journaled in bearings formed in a frame 64 bolted to a base plate 65 forming an extension of the base 24. The worm meshes with and drives a worm wheel 66 which is mounted on a cross shaft 67 journaled in bearings 68 (Fig. 8) formed in the frame.

The shaft 67 extends beyond the bearings and at one end carries a sprocket 69 over which operates an endless chain 71. Chain 71 passes up and over a sprocket 72 mounted on the end of the shaft 56 adjacent the bearing 58. The conveyor belt 45 is kept taut by a belt tightener device 73 (Fig. 3) secured to the side of the auxiliary frame 22.

As the foremost can a on the belt conveyor approaches the machine end of the conveyor it comes against and is halted in its advance by an arm 81 (Figs. 1 and 8) which extends over the top of the conveyor and into the path of the moving cans. The arm is an integral part of a stop lever 82 mounted on the upper end of a vertical shaft 83 carried in a bearing 84 formed in the auxiliary frame 22. The lower end of the shaft is secured to a cam lever 85 which at its free end carries a pin 86 on which is mounted a cam roller 87. The cam roller engages within a groove 88 of a cam 89 (see also Fig. 3) mounted on an intermittently movable shaft 91 disposed longitudinally under the auxiliary frame in bearings 92 which are bolted to the bottom of the frame at each end.

Shaft 91 is rotated through one complete revolution and then remains at rest for a considerable period of time. Accordingly the arm 81 is held in the path of the cans for a corresponding time period. This position of the arm causes the cans moving in with the belt 45 to stack up or collect one in back of the other and in a straight line on the conveyor.

The cans are held in line along one side by double, vertically spaced guide rails 95 secured to brackets 96 which are bolted to the top of the auxiliary frame. A guide rail 97 is disposed along the opposite side of the belt and is held in brackets 98 formed on a base 99. The inner edge of this base also functions as a guide for the bottom of the cans and is in turn bolted to the top of the auxiliary frame. A guide rail 100 is indirectly carried by the brackets 98 and cooperates with the elements 97, 99 to keep the cans in processional order.

The guide rail 97 (see also Figs. 8 and 12) also functions as a part of a detecting device which counts off the cans as they pass in line on the belt conveyor and this also acts to collect them into groups of a predetermined number. For each can of the group there is provided an inverted T shaped weight arm 101 which is suspended from a weight bar 102 carried in the brackets 98, the weight arms hanging in a row adjacent one side of the belt conveyor.

Each weight arm comprises a substantially vertical stem plate 103 which at its top end is formed with an enlarged head 104 extending out from and overhanging the rear side of the plate. The bottom of the overhanging part of the head is cut longitudinally thereof parallel with the plate and with an inverted V-shaped groove 105 which engages and fits over a knife edge 106 formed along the top edge of the weight bar 102. The weight arms are thus hung on the bar and are normally free to swing in pendulum fashion toward and away from the cans on the conveyor.

The weight arms are located longitudinally of the supporting weight bar so that they will keep their longitudinal position without interference with the freedom of their swinging movements. From the top of each head 104, a lug 107 extends up and is loosely engaged in a notch 108 cut in a depending flange 109 of a locating bar 111. This bar is secured directly to the tops of the brackets 98 and in turn provides direct support for the guide rail 100. Bar 111 extends parallel to and is spaced above the top of the weight bar 102.

The locating bar 111 preferably has a great number of notches 108 extending along the entire length of the bar flange 109 as best shown in Fig. 3 and by properly selecting the right notch for each lug 107 each weight arm is located as near as possible to the center of the can it is to coact with in the detecting and transferring steps to follow. In this manner the weight arms are shifted along the weight bar and located in position when adjusting for different sizes of cans.

At the bottom of each weight arm the stem plate 103 is formed with a transverse L-shaped foot (Fig. 12) which on one side extends forward toward the conveyor 45 as a shoe section 114 having a beveled corner 115 this being normally in the can path. On the opposite side the foot extends rearwardly in a counterbalance weight section 116. The latter is cut away adjacent the stem in a channel 117, for a purpose hereinafter explained.

The weight of the counterbalance section 116 which is beyond the vertical line center of suspension of each of the arms is sufficient to normally throw the arm forward against the guide bar 97. A boss 118 formed on the front of the stem plate is provided for an engagement pad and functions as a stop for the forward swinging movement of the arm.

As the cans pass the weight arms in their advancement with the conveyor belt they ride along the beveled corner 115 of each shoe 114 that they pass and swing each weight arm back out of the way. As soon as a can passes an arm it swings back into forward position again ready for the next can. When a can stops in line as the cans pile up back of the stop lever 82, it holds back its engaged weight arm.

It is only when all of the weight arms 101 are held back that the number of cans required to complete the group are in proper position to be moved forward as a unit and this will now be explained.

A horizontal L shaped detector plate 121 (Figs. 1, 8 and 12) extends longitudinally of the runway containing the accumulated cans. This plate has a depending front flange 122 and its rear edge is secured on a rock shaft 123. The shaft is carried in the brackets 98. Any weight arm when in its forward or non-engaging can position will be below and in the path of movement of the flange 122 of the detector plate when rocking of the shaft is attempted.

The rock shaft 123 is periodically moved and this may result in a full rocking action, when the full group of cans is formed, or the movement may be arrested by the flange 122 coming into engagement with one or more of the weight sections 116 as when there is a vacancy in the can line.

The rock shaft carries an arm 125 which is pivotally connected with a substantially vertical rod 126 (see also Fig. 3). The lower end of the rod passes through and is slidingly engaged in a swivel block 127 carried on the bifurcated end of an arm 128 of a bell crank lever 129. This lever is mounted on a shaft 131 carried in an extension 132 formed as an integral part of the base of the speed reduction bracket 64. The other arm of the bell crank lever indicated at 134 carries a pin 135 on which is mounted a cam roller 136. This roller operates within a groove 137 of a barrel cam 138 and the latter is mounted on the end of the speed reduction shaft 67 this being opposite the end which carries the sprocket 69.

The shaft 67 revolves in time with the movement of the belt conveyor 45. The detector plate 121 is accordingly shifted at a time interval which is sufficient for the belt to bring into position individual cans required to make up the desired group to be treated at one time.

If the group of cans in the line is not complete, the detector flange 122 will strike against the tops of the weights 116 of those arms which are not held back by properly positioned cans. When the full movement of the detector plate is thus arrested, the movement of the bell crank lever is taken up by a spring 141 which encircles the lower end of the rod 126 and which is interposed between the swivel block 127 and a collar 142 carried on the rod. A collar 143 is also carried on the extreme end of the rod below the swivel block to prevent its becoming disengaged from the latter.

When a group of cans is complete all the weight arms 101 will be held back by the cans and all of the weights 116 will be out of the way of the detector plate flange 122. At such time the flange 122 passes down into the aligned channels 117 of the adjacent weight arms.

The turning of the rock shaft 123 through its full movement closes a normally open electric switch 145 (Figs. 1, 3 and 6) which in turn completes an electric circuit which sets in motion devices for segregating the collected group of cans from the incoming cans. The circuit is part of the wiring diagram illustrated in Fig. 13 which will be fully explained hereinafter. Operation of the switch is effected by a lever arm 146 mounted on the extreme end of the rock shaft adjacent the can receiving end of the conveyor which engages and actuates a balanced switch arm 147 to close the switch.

The closed circuit includes and sets in motion an electric motor 148 (Fig. 5) which is bolted to the base plate 24 at the can discharge end of the machine. The motor shaft carries a gear 151 which meshes with and drives a gear 152 mounted on a shaft 153 carried in bearings 154 formed in each of the leg members 23.

It is this shaft that actuates the shaft 91 already briefly referred to in connection with the cam 89 and the can stop finger 81. The two shafts are connected by a chain 155 (Fig. 3) which operates over a driving sprocket 156 mounted on the end of the shaft 153 and a driven sprocket 157 mounted on the adjacent end of the shaft 91. When the shaft revolves and the cam 89 actuates the cam arm 85 (Fig. 8) and withdraws the stop finger 81 (Fig. 1) out of can holding position the collected group of cans is released.

Simultaneously with this action the flow of incoming cans from the disc 28 is stopped by an arm 161 (Figs. 1 and 6) which swings across the can path at the end of the rails 41. Arm 161 is mounted on the upper end of a vertical shaft 162 carried in a bearing 163 formed in the auxiliary frame 22 adjacent the delivery end of the feeding device guide rails 41. On the lower end of the shaft 162 there is mounted an arm 164 which carries a pin 165 on which is mounted a cam roller 166 engaging within a groove 167 of a barrel cam 168 (see also Fig. 3). This cam is mounted on and turns when the shaft 91 is rotated.

An overhead conveyor is also set in motion by the starting of the motor 148. This conveyor comprises an endless chain 171 (Figs. 1, 3, 4, 5 and 11) which is disposed longitudinally and over the top of the can path extending forward of the disc 28. At the entrance of this can path the chain passes over an idler sprocket 172 (Fig. 3) which is mounted on one end of a horizontal shaft 173 carried in a bearing 174 formed in a bracket 175 which is bolted to the end of the auxiliary frame 22. A collar 176 is pinned to the free end of the shaft for holding it in its bearing 174.

At the vacuumizing and gassing end of the machine the chain 171 takes over and is driven by a driving sprocket 178 which is keyed to one end of a horizontal shaft 179 carried in a bearing 181 formed in a bracket 182. The bracket is bolted to the top and one side of a chamber housing 183 (Figs. 4, 5 and 11) which is mounted on the top of the main frame 21 and on the side thereof.

The sprocket 178 is rotated periodically by the motor 148 through the shaft 153, as follows. A sprocket 185 is mounted on the shaft 153 and drives a sprocket 186 through a connecting chain 187. Sprocket 186 is mounted on one end of a horizontal shaft 188 carried in a bearing 189 formed in a bracket 191 depending from the bottom of the main frame 21.

The opposite end of the shaft 188 projects beyond the bearing 189 and carries a bevel gear 192 which meshes with a bevel pinion 193. The pinion is mounted on one end of a short horizontal shaft 194 carried in a suitable bearing formed in a bracket 195 also depending from the bottom of the main frame 21. A sprocket 196 is carried on the opposite end of the shaft 194 and this sprocket driving a sprocket 197 on the end of the chain sprocket shaft 179 through the medium of a connecting chain 198.

Intermediate the sprockets 172, 178, the chain 171 is supported along its upper run between upper and lower guide rails 201, 202 (Fig. 11) carried in the bifurcated upper end of a plurality of brackets 203. Each bracket is formed with a rearwardly projecting pad 204 which is secured to the top of a channel shaped beam 205 extending the full length of the machine and supported at its ends in the sprocket brackets 175, 182. Each bracket 203 extends down adjacent the front of the beam 205 and is formed with a bifurcated lower end similar to its upper end and directly beneath. These lower ends carry upper and lower guide rails 207, 208 between which the lower run of the chain is supported.

At equally spaced intervals along its length the chain 171 carries studs 211 on each of which is pivotally mounted a can moving member 212 comprising a short arm 213 and a similarly disposed but oppositely directed depending bent long arm 214. The end of the short arm carries a pin 215 on which is mounted a roller 216, while the free end of the long arm is enlarged in a head 217.

The members 212 are carried along with the moving chain 171 in a counter-clockwise direction (Figs. 3 and 5). When on the upper run of the chain they hang with the head 217 of each long arm slidingly supported on a rail 218 which extends longitudinally of the machine and under the adjacent chain section. The rail is supported on laterally projecting lugs 219 formed on the front of the brackets 203.

As each member 212 approaches the idler sprocket 172 the head 217 of its arm 214 comes to the end of the rail 218 and the roller 216 on its short arm 213 thereupon enters into a cam groove 221 (Figs. 3, 5 and 11) of a stationary channel or cam track 222. This cam track extends substantially the full length of the machine and adjacent the lower run of the chain 171. It is bolted to and supported by the bottom of the bracket lugs 219.

Adjacent the sprocket 172 the end of the cam is curved upwardly and is bolted to a lug 223 formed on the top of the bracket 175. At this end also the channel groove is so shaped as to cause the head 217 of the arm 214 to dip down and sweep back (toward the left as viewed in Fig. 3), the roller 216 being momentarily held in a pocket 224 (Fig. 3) at such time.

As the member 212 continues on and is brought down into the lower run of the chain, the roller 216 is snapped out of the cam pocket 224 and continues its advance along the cam groove 221 which first curves down and then merges into a straight section which is substantially parallel with the lower run of the chain. This is directly over the tops of the grouped cans held on the conveyor belt 45.

With the roller 216 traveling in the groove the arm 214 is rigidly supported as its head 217 now engages the rearmost can in the line and pushes it ahead with the entire can group moving all of these cans off the end of the belt conveyor 45. This transfers the group from the auxiliary frame 22 and into the main frame 21 adjacent the vacuumizing and gassing mechanism.

As soon as the propelling member 212 has cleared the delivery end of the disc feeding devices, the arm 161 is withdrawn from can blocking position and succeeding cans are again permitted to pass from the feeding devices onto the belt conveyor. Similarly when the last of the cans in the group being transferred to the vacuumizing and gassing mechanism has passed the finger 81 it is immediately moved back into can blocking position across the belt conveyor. Thus collection of a new group of cans begins.

The roller 216 of the member 212 which is propelling the first group of cans engages an inclined section 228 (Fig. 3) of the cam track 222, this being about the time the last can clears the finger 81, and the arm 214 is momentarily withdrawn or backed away from the cans, see the arm shown to the extreme right of Fig. 3.

The cans of the first group are now fully received in a cradle 231 (Figs. 4, 5 and 11) which is mounted on slides 232 carried in slideways 233 (see also Fig. 2) formed transversely in the top of the main frame 21. The cradle carries a pair of can racks 234, 235 one on each side and each adapted to hold a group of cans.

Each rack comprises a plurality of U-shaped brackets 237 the bottoms 238 of which support a pair of rails 239 on which the cans are brought to rest by the propelling overhead conveyor chain 171. The vertical legs of each bracket 237 are designated by the numeral 241 and one of these, the inner leg is secured to the side of the cradle. The same thing applies to the rack on the opposite side of the cradle. A can guide bar 242 extends between the outer legs of the bracket 237 on each side and a similar guide bar 243 is mounted on opposite walls of the cradle, the bar 243 on each side being spaced from and opposite the bar 242 on that side. This provides the runways for the spaced can racks 234, 235.

The cradle 231 is disposed between the chamber housing 183 and a similar housing 245 (Figs. 4, 5 and 11). Both housings are mounted on top of the main frame 21 being arranged adjacent the longitudinal edges thereof. Each housing is normally closed on all sides excepting the inner side which faces the cradle. Within the housings 183, 245 are treating chambers 246, 247 for the cans.

The cradle is moved transversely of the frame 21 each time a group of cans is received in a can rack 234 or 235 and such a movement inserts the rack and its cans into one chamber or the other. This cradle shift is effected by a cam 251 (Figs. 5 and 11) which is mounted on the intermittently revolving shaft 153. In the present embodiment this shaft 153 is rotated through 180 degrees on each movement and then it comes to rest.

The cam 251 is provided with a groove 252 in which operates a roller 253 that is mounted on a pin 254 carried in one of a pair of arms 255 of a cradle moving member 256. The lower end of this member is disposed in a well 257 formed in the base 24 and is mounted on a pivot shaft 258 which is carried in bearings 259 formed in the base. The two arms of the member 256 extend up on each side of the cam and around the shaft 153. Each arm is cut away in an elongated slot 261 the sides of which clear the shaft in all positions of the arms. At their tops the arms are joined in a horizontally disposed section 262.

The section 262 is provided with a substantially vertical slot 265 in which is bolted one end of a plate 266 which extends up and into a vertical opening 267 formed centrally of the cradle 231 and confined between parallel side walls. The upper end of the plates is secured to a horizontal bar 268 the ends of which project beyond the plate and are reduced in diameter providing trunnions 269 (Fig. 4). On these trunnions are mounted slide blocks 271 which slide in guideways 272 formed in side walls of the cradle.

Thus, when the arms 255 shift backward or forward on their pivot shaft 258 the cradle 231 moves transversely of the machine from one to the other of its two positions. One such position is shown in Fig. 11, the can rack 235 being at such time enclosed in the chamber 247. The inner side of the chamber when the parts are in this position is closed by the adjacent side wall of the cradle. A rubber or other suitable sealing gasket 275 is interposed between the edge of the chamber housing and the side wall of the cradle and is embedded in a groove 276 formed in the housing, thus providing a hermetic seal for the chamber.

With the cradle in this position, the other can rack 234 is in direct longitudinal alignment with the line of travel of the conveyor belt 45 extended and is receiving cans from the belt as the group is being transferred by the overhead chain conveyor already fully described. Thus it is seen that while one group of cans is being vacuumized and passed or otherwise treated in the chamber 247 another group is being loaded into the can rack 234.

When the cradle 231 moves toward the right (Fig. 11) the cans carried in the rack 234 are moved into the chamber 246, the adjacent side wall of the cradle engaging a sealing gasket 275 in the same manner as already described in connection with chamber 247 thus hermetically sealing the cans in the chamber ready for the vacuumizing and gassing operation.

At the same time the rack 235 is withdrawn from the chamber 247 and is returned to the position just occupied by the rack 234 being directly in line with the belt travel extended and the overhead chain conveyor. It is this cradle movement back or forward that takes place during that time the conveyor arm 214 was momentarily retarded or backed away from the last can in the group.

Immediately following the shifting of the cradle the arm 214 which swung back as its roller 216 traversed the incline cam section 228, again moves forward passing through the cradle just brought back into alignment. The roller 216 thereupon moves along a further straight section of the cam groove 221, this latter being at a higher plane than that of the first straight section.

The rack which has been brought back into alignment with the overhead chain travel is filled with the group of cans which have been fully vacuumized and gassed, and the chain arm 214 during its subsequent passage through the rack moves them longitudinally of the rack and out onto a continuously moving discharge disc 281 (Figs. 4 and 5). The discharge disc 281 is mounted on the upper end of a vertical shaft 282 which is journaled in a bearing 283 formed in the top of a gear housing 284 mounted on the end of the main frame 21, and in a bearing 286 formed in a cover plate 287 secured to the bottom of the housing.

Rotation of the disc is effected by the continuously operating motor 62 (Fig. 3). For this purpose the disc shaft 282 carries a bevel gear 288 (Fig. 5) which is driven by a pinion 289 carried on the forward end of a horizontal shaft 291. This end of the shaft is journaled in a bearing 292 formed in the gear housing 284. The shaft also extends back through the main frame 21 and projects into the gear casing 59 (Fig. 1) of the auxiliary frame 22 where it terminates at the cross shaft 56. It is journaled at its rear end in a bearing 293 formed in the casing.

A pinion 294 is mounted on the rear end of the shaft and is driven by a gear 295 which is mounted on the cross shaft 56 adjacent its bearing 58. It is this continuously rotating shaft which, it will be recalled, is driven by the motor 62. The vacuumized and gassed cans coming onto the disc 281 are received alternately from the cradle racks 234, 235. During discharge the cans are guided between spaced guide rails 296 to any suitable place of deposit. The guide rails are secured to the gear housing 284.

The placing of all of the cans of any one group on the discharge disc 281 completes one cycle of operation of the machine and the motor 148 is stopped after each cycle by the breaking of the motor circuit. This is effected by the operation of an electric switch 297 (Figs. 3 and 6) which is secured to the side of the auxiliary frame 22 adjacent the cam 168. This switch is opened and held open by a lug 298 which is secured to the side of the cam 168 and which is brought into engagement with a switch actuating arm as the cam comes to rest at the end of its cycle of movement.

The vacuumizing and gassing of the cans when placed in either chamber 246, 247 is controlled by valve mechanism and this is made effective on the particular chamber which has been sealed on the group of cans placed therein. This mechanism comprises a pair of valve boxes 301, 302 (Figs. 5, 9, 10 and 11) disposed under the main frame 21 in respective vertical alignment with the chamber housings 245, 183. Each valve box is supported on a pair of vertical bars 303 bolted at their top ends to the side of the main frame 21 and at their lower ends to the side of the base plate 24.

The valve box 301 is formed with three superimposed compartments 305, 306, 307 (Figs. 9 and 10) having outlet ports 308, 309, 311 which pass through the outer wall of the box. These ports are adapted to be covered by a slide 314 which has a registering recess 315 formed in the face adjacent the ports. A slide cover 316 secured to the outer face of the valve box holds and guides the slide so that it may be moved vertically to effect communication between adjacent ports as will be hereinafter explained.

Movement of the slide is effected by a cam 318 carried on the longitudinal shaft 153. In one face of the cam a groove 319 is provided for a roller 321 which is mounted on a pin 322 carried in one end of a lever 323. The lever is mounted on a short shaft 324 carried in a lug 325 formed as an integral part of the valve box 301. The opposite end of the lever is slotted and extends into a bifurcated lower end of the slide as shown in Figs. 5 and 9.

The valve box 302 on the other side of the frame 21 is similar in construction to the valve box 301, having also three superimposed compartments 331, 332, 333, provided with outlet ports 335, 336, 337 respectively formed in the outer wall of the box. These ports like the ports in box 301 are adapted to be covered with a slide 338 having a recess 339 (Fig. 10), the slide being vertically guided by a slide cover similar to the cover 314.

Slide 338 is moved by the same cam 318 that operates slide 314, the back of the cam being formed with a cam groove 341 which is identical in its contour with the cam groove 319 but the two grooves are relatively located 180° apart. The groove 341 is engaged by a roller 342 carried on one end of a lever 343 which is mounted on a short shaft 344 carried in a lug 345 formed integrally with the bottom of the valve box 302. The end of the lever is slotted and is connected with the lower end of the slide 338 in the same manner as the slide 314 is connected with its actuating lever 323.

The valve boxes 301, 302, are interconnected by a system of piping as shown in Fig. 10. The upper compartment 305 of box 301 is connected by a pipe 351 with the upper compartment 331 of box 302. The compartment 305 is also connected with its associated chamber 247 by a pipe 352. The lower compartment 307 of box 301 is connected by a pipe 353 with the lower compartment 333 of box 302. Compartment 333 is also connected with its associated chamber 246 by a pipe 354.

By this interconnection of piping the chambers 246, 247 may be individually and alternately vacuumized and gassed as will now be explained. Compartment 306 of box 301 is connected by a pipe 355 to a suitable source of vacuum such as a pump or the like. Likewise compartment 332 of box 302 is connected by a pipe 356 to a suitable supply of an inert gas which is preferably carbon dioxide which may be contained in suitable storage cylinders this being a commercial article.

When a group of cans is sealed in its chamber 246 or 247 it is subjected to vacuumizing and gassing by proper manipulation of the slide 338 or slide 314. For example the can group may be sealed in the chamber 247, as illustrated in Figs. 9 and 11 and the treating steps thereupon proceed as follows. The groove 319 in the cam 318 first raises the associated slide 314 of valve box 301 and moves it out of the neutral position shown in Fig. 9, moving it into the position shown in Fig. 10. Communication is thereupon effected between the valve compartments 305, 306 and the chamber 247 and air is exhausted or drawn out from the chamber and from the cans therein by way of the pipe 352, compartment 305, port 308, slide recess 315, port 309, compartment 306 and vacuum pipe 355.

Cam groove 319 next returns or lowers the slide 314 into its neutral position cutting off communication between ports 308, 309 and holding the chamber and the cans under dead vacuum. The other valve unit now comes into play.

The cam groove 341 in the back of the cam 318 raises the slide 338 of valve box 302 out of its neutral position (Fig. 10) into a position where the ports 335, 336 are in communication. Gas from the supply pipe 356 and the central compartment 332 then passes through the port 336, slide recess 339, port 335 into the compartment 331, thence through the pipe 351, compartment 305 in the other valve unit and pipe 352 into the chamber 247 and into the cans therein. At the proper time, the cans have then received their gas charge, the cam groove 341 again returns the slide 338 into its neutral position and the supply of gas is accordingly cut off from the chamber.

Similarly when a group of cans is sealed in the chamber 246, the vacuumizing and gassing proceeds. This time the slide 314 of the valve box 301 is first lowered out of its neutral position. This lowering of the slide opens communication between the ports 309, 311 and air is thereupon drawn out of the chamber 246 and from the cans therein by way of the pipe 354, valve compartment 333 of the valve box 302, pipe 353, compartment 307, port 311, slide recess 315, port 309, compartment 306 and vacuum pipe 355. The cam groove 319 now returns the slide 314 to its neutral position thereby cutting off the vacuum.

The groove 341 on the back of the cam next lowers the slide 338 of valve box 302 from its neutral position into its lowermost position. This action opens communication between the ports 336, 337 permitting the gas from the supply pipe 356 to pass by way of the compartment 332, the communicating valve ports and the associated slide recess 339, the compartment 333, pipe 354 and thence into the chamber 246 and the cans therein.

Thus it is that the valve mechanism, involving both valve units, is double acting, serving one chamber and the cans contained therein while the cam 318 is effective through one half of each revolution and serving the other chamber and the cans therein while the cam completes its remaining half revolution.

The electric wiring diagram hereinbefore briefly referred to and schematically illustrated in Fig. 13 includes the various switches and their circuits for operating the electric motors 62, 148. Electric current may be suitably supplied as by a generator 361 having a main service wire 362 leading from one side and a service return wire 363 connecting with the other side.

The circuit including the continuously operating motor 62 which it will be recalled, actuates the disc can feeding devices, the belt conveyor, detecting devices and discharge mechanism, comprises a wire 364 connecting one side of the motor with the main service wire 362. A wire 365 connects the opposite side of the motor with the return service wire 363. This is a simple closed circuit between generator and motor.

The circuit for starting and stopping the motor 148 (which operates the vacuumizing and gassing mechanism) includes the starting switch 145, referred to in connection with the can detecting device, and the stopping switch 297. This circuit comprises a wire 367 leading from the main service wire 362 to one side of the stop switch 297 (see also Fig. 6) which is normally open. The other side of the switch is connected to one side of the motor 148 by a wire 368, the opposite side of the motor being connected by a wire 369 to the return service wire 363.

The normally open starting switch 145 is connected with this circuit by a wire 371 leading from the wire 367 and by a wire 372 to the wire 368. It is this switch 145 which is momentarily closed by the detecting device when a group of cans has been collected. The closing of the switch permits current to flow from the main service wire 362, by way of wires 367, 371, the closed switch 145, wires 372, 368, through the motor 148, wire 369 back to the return service wire 363 thus causing the motor to start.

Starting of the motor 148 sets in motion the vacuumizing and gassing mechanism of which the cam shaft 91 is an operating part (Fig. 6). As soon as this shaft begins to turn the lug 298 on the cam 168 rides off the actuating arm of the switch 297 causing it to close. A new circuit is thereby established which does not include the switch 145 which may be immediately opened and its circuit broken. The newly created circuit serves as a holding circuit to keep the motor operating throughout a complete cycle of the machine. Current for this circuit passes along the wire 367, switch 297, wire 368, motor 148, and wire 369 back to the return service wire.

At the end of the machine cycle, i. e., when the shaft 91 has made one complete revolution the lug 298 again engages the actuating arm of the switch 297 thereby breaking its circuit and causing the motor and the mechanism actuated thereby to stop. It will be observed that this positioning of the parts sets the stage for the next cycle when a new group of cans again closes the starting switch 145. The motor 148 is thus started operating only by the switch 145 and is then only maintained in operation by the switch 297.

While the vacuumizing and gassing mechanism is in operation other electric circuits control the degree of plus or minus pressures of vacuum and of gas in the chambers and in the pipe lines. A vacuum gauge 374 (Figs. 4 and 5) is mounted on each of the treating chamber housings 245 and 183 and the degree of vacuum in a chamber under vacuum is thus visibly discernible at all times. However, in addition to this gauge feature there are provided danger signals for both the vacuum and the gassing lines.

Figure 14:
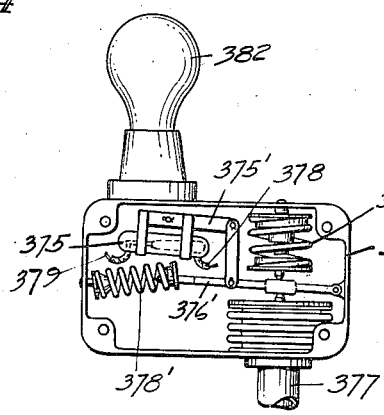
Fig. 14 is a face view of one of the switch units of a vacuum control device with its box cover removed as viewed along the line 14—14 in Fig. 4.

The danger signal or indicating device just mentioned for vacuum comprises a signal lamp which lights up when the vacuum is not sufficient for the purpose. Lighting of this lamp is effected by the closing of a circuit containing a mercury switch 375 (Figs. 13 and 14). Switch 375 is physically located in a closed box 376 (Figs. 4 and 5) which is carried on the upper end of a short pipe 377. The other end of this pipe connects with the pipe 355 which leads to the source of vacuum.

The switch 375 may be of the usual tilting bulb type this being a commercial article of manufacture. The bulb is suitably arranged so that the degree of vacuum in the line changes its position and when tilted in one position a globule of mercury connects the ends of the switch poles and closes the switch. For this purpose switch 375 is mounted in a swinging cradle 375' which is connected by a link with a lever 376', one end of which is pivoted on the switch box 376. The lever 376' has an upper and a lower position and is moved into one or the other of its two positions by a Sylphon bellows which is located in the box on the end of the pipe 377. The inside of the Sylphon, therefore, is in constant communication with the vacuum line. The Sylphon at its top engages the lever 376' and a spring 377' also located in the box aligns with the bellows and tends to keep the lever pressed down.

As long as there is sufficient vacuum in the line, the atmospheric pressure in the box working on the top of the Sylphon together with the depressing force of the spring 377' holds the lever 376' in its lowered position. When, however, the vacuum in the pipe 377 is insufficient, the Sylphon is extended and its top, pressing against the lever 376' moves up throwing the lever into its raised position (Fig. 14) in which position the cradle 375' holds the mercury switch 375 closed. A snap spring device 378' pressing on the free end of the lever 376' insures that the lever quickly snaps over from one position to the other.

One pole of the mercury switch 375 (Fig. 13) is connected by a wire 378 to the main service wire 362. The other side of the switch is connected by a wire 379 to one terminal of a lamp 382 which is mounted on the switch box 376 and constitutes the signal lamp for vacuum and the opposite lamp terminal is connected by a wire 383 to the return service wire 363. When the degree of vacuum in a chamber or the pipe line connected with a chamber, is not sufficiently high, therefore, to properly vacuumize the cans, the mercury switch 375 is closed (Fig. 14) by the raising of the lever 376' and the rocking of the cradle 375' and the lamp 382 is illuminated and visibly indicates such condition.

Figure 15:
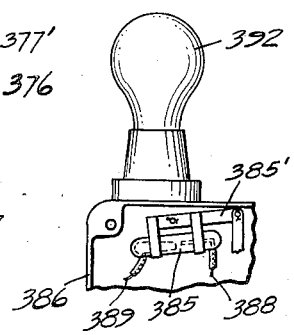
Fig. 15 is a similar view with parts broken away of one of the switch units of a gas control device.

The danger signal or indicator for the gas pipe line comprises the same kind of a mercury switch as switch 375, the gas line switch being indicated by the numeral 385 (Figs. 13 and 15). Switch 385 is located in a closed box 386 (Figs. 4 and 5) which is carried on the end of a short pipe 387 connecting with the gas supply pipe 356. A suitable switch actuating mechanism similar to that associated with the vacuum line switch is also provided in the gas switch box 386. In the gas switch box the mercury switch is carried in a swinging cradle 385' and as long as its associated Sylphon bellows which moves the cradle is distended by sufficient pressure of gas in the gas line the cradle is held in the raised position shown in Fig. 15. The mercury switch 385 remains open when so held. In the other position of the cradle, that is, when the gas pressure in the gas line falls so that the Sylphon collapses and the cradle 385' is shifted, then an auxiliary circuit is set up by the closing of the mercury switch 385.

One side of the switch 385 (Fig. 13) is connected by a wire 388 to the main service wire 362. The other side is connected by a wire 389 to one terminal of a danger signal lamp 392 which is mounted on the switch box 386 (see also Figs. 4, 5 and 15), the other lamp terminal being connected by a wire 393 to the return service wire 363. When the gas pressure falls below a predetermined degree which is not sufficient to properly gas the cans in a chamber the mercury switch is closed thereby establishing a circuit which permits current to flow through the lamp 392 and visibly indicate the low condition of the gas pressure.

In gassing the cans in a chamber it is sufficient to admit gas close to atmospheric pressure and this gas flows into the exhausted space in chamber and cans. Provision is made for further controlling this admission of gas so that the gas pressure will never greatly exceed atmospheric pressure. This is effected by a pair of mercury switches 401, 402, one for each of the respective chambers 246, 247.

One side of the switch 401 (associated with chamber 246) is connected by a wire 405 to the main service wire 362. The other side of the switch is connected by a wire 406 to one end of a solenoid 407 (see also Fig. 17) which is associated with a shut-off valve 408 included in the gas supply pipe 356. The opposite end of the solenoid is connected with the return service wire 363. The switch 401 is set so that it closes the circuit through the solenoid 407 when a given gas pressure has been reached and the solenoid when energized cuts off the gas supply through the valve 408.

The gas supply for the chamber 247 is controlled in the same manner. One side of the switch 402 is connected by a wire 411 to the main service wire 362, the other side of the switch being connected by a wire 412 to the wire 406 of the other chamber control circuit. Thus either switch will energize the solenoid 407 to close the gas cut-off valve 408 when pressures in the can chambers 246, 247 reach the predetermined point. One ounce above atmospheric pressure has been found to be a satisfactory point of setting for chamber gas pressure.

The switches 401, 402 may be positioned in any suitable location convenient to the chambers 246, 247. Figures 4 and 5 show a switch casing 413 for the switch 401 and a similar casing 414 for switch 402. The control parts such as diaphragm or Sylphon for the switches may be arranged in housings 415 and 416 connected with the respective casings 413, 414. Each housing may be conveniently mounted on pipes 417 threaded into the top of casing 183 or 245 so that the interior of the chamber is in communication with the interior of its associated switch housing.

Switch 401, casing 413 and housing 415 are identical to the switch 402, casing 414 and its housing 416, Fig. 16 showing in detail the parts of the gas control for the switch 401.

Switch 401 is mounted in a cradle 418 which is carried for swinging movement within the casing 413. It is connected by a link to a lever 419 one end of which is pivoted on a side wall of the casing. Lever 419 has an upper and a lower position and is moved into one or the other of its two positions by a Sylphon bellows which is located in the housing 415. The inside of the Sylphon, therefore, is in constant communication with the gas line as in pipe 417. The Sylphon bellows at its bottom end is closed by a disc 420 which carries a vertically extending pin 421 the upper end of which extends into the casing 413 and engages below the lever 419.

A spring 422 is mounted above and engages the lever 419 and is in vertical alignment with the pin 421. This spring is supported at its upper end in the casing 413. A second spring 423 is disposed within and is carried by the housing 415 and surrounds the lower portion of the pin 421. This spring tends to lift the pin but is opposed by the upper spring 422 which together with atmosphere acting on top of the disc 420 normally holds the lever 419 in its lower or gas flowing position as in Fig. 16.

When there is an excess of gas in the pipe line 417 the Sylphon is compressed, its disc bottom moving up. This lifts the pin 421 and shifts the lever 419 into its upper position. When the mercury switch is shifted its electric circuit energizes the solenoid 407 as has already been described and this cuts off the gas supply through the valve 408.

A snap spring device 424 pressing on the free end of the lever 419 insures that the lever quickly snaps over from one position to the other.

Figure 17:
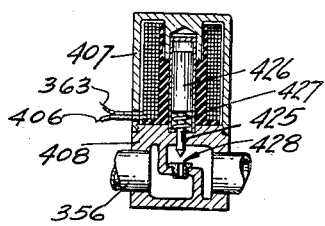
Fig. 17 is a cross-section taken through a gas valve located in the pipe line shown in Fig. 5.

As illustrated in Fig. 17 the valve 408 in the gas line is adapted to be closed by a pin valve 425 carried on the lower end of a solenoid core 426 which is slidably mounted centrally of the core winding of the solenoid 407. When the solenoid is energized the core and valve are moved down against the action of a core spring 427 mounted between the valve and the solenoid and the former is moved down to close an opening 428 connecting the two chambers of the valve.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for treating filled containers, the combination of means for collecting said containers into a group containing a predetermined number, a chamber adapted to receive the group of containers for a treating operation, means for transferring said container group from said collecting means into said chamber, said transferring means having devices whereby said chamber is made air-tight after receiving said group of containers, and means operable by said collected containers for controlling the operation of said transferring means.

2. In a machine for treating filled containers, the combination of means for collecting said containers into groups containing a predetermined number, means associated with said collecting means for detecting the presence of a said container as it is positioned in a said group, a chamber adapted to receive a group of said containers for a treating operation, and means controlled by said detecting means for transferring said group of containers into said chamber when said group is complete, said transferring means having devices whereby said chamber is made air-tight after receiving said group of containers.

3. In a machine for treating filled containers, the combination of means for collecting said containers into a group containing a predetermined number, means associated with said collecting means for detecting the presence of a said container as it is positioned in a said group, a chamber adapted to receive said group of containers, means for transferring said group of containers into said chamber, and means associated with said detecting means for setting in motion said transferring means when the predetermined number of cans in said group is present, said transferring means having devices for supporting a group of containers and having devices whereby said chamber is made air-tight after receiving said group of containers.

4. In a machine for treating filled containers, the combination of means for collecting said containers into a group containing a predetermined number, means associated with said collecting means for detecting the presence of a said container as it is positioned in said group, a chamber adapted to receive said group of containers for a vacuumizing and gassing operation, means for transferring said group of containers into said chamber, and means associated with said detecting means for holding said transferring means inoperative until a said group of containers is complete, said transferring means having devices for supporting a group of containers and having devices whereby said chamber is made air-tight after receiving said group of containers.

5. In a machine for treating filled containers, the combination of means for feeding containers into said machine, means for collecting said containers into a group containing a predetermined number, means associated with said collecting means for detecting the presence of a said container as it is placed in said group, means for stopping the flow of containers from said feeding means when a group is complete, a chamber adapted to receive said group of containers for a vacuumizing and gassing operation, and means for transferring said completed group of containers into said chamber.

6. In a machine for treating filled containers, the combination of means for conveying said containers into a group containing a predetermined number, a movable detector for each container of a group, means for holding said containers in a predetermined arrangement until said group is complete and for releasing said containers upon the completion of said group, a chamber adapted to receive said completed and released group of containers, and means for transferring said completed and released group of containers into said chamber, said transferring means having devices for supporting a group of containers and having devices whereby said chamber is made air-tight after receiving said group of containers.

7. In a machine for treating filled containers, the combination of means for feeding said containers into groups, each group containing a predetermined number, means actuated by grouped containers for interrupting the feeding of succeeding containers, a cradle for successively receiving said groups of containers, means for transferring each group into said cradle, a chamber located adjacent said cradle and adapted to receive a said group for vacuumizing and gassing operation, and means for moving said cradle relative to said chamber to position a said group of containers therein.

8. In a machine for treating filled containers, the combination of means for feeding said containers into groups each group containing a predetermined number, means actuated by individual containers for detecting the completeness of the group, a pair of chambers adapted to receive separate groups of containers for a treating operation, a movable cradle disposed between said chambers and having container holding racks associated therewith, means for transferring said groups of containers into alternate racks, and means for moving said cradle alternately into sealing engagement with said chambers while positioning one of said racks and the containers held therein into a said chamber.

9. In a machine for treating filled containers, the combination of means for feeding said containers into groups containing a predetermined number, gravitating devices each actuated by a container of a group for detecting the completeness of the group, a plurality of chambers adapted to receive successive groups of containers for a vacuumizing and gassing operation, a movable cradle disposed between said chambers and having a plurality of container holding racks associated therewith, means for moving said cradle into successive sealing engagement with a said chamber and at the same time positioning one of said racks with a group of containers into said sealed chamber, and means for transferring a successive group of containers into another of said racks while a preceding group in its rack is being vacuumized and gassed in its sealed chamber.

10. In a machine for treating filled containers, the combination of means for feeding said containers into groups, each group containing a predetermined number, weight arms movable by each of the containers of a group for detecting the completeness of said group, a cradle for successively receiving said groups of containers, means for transferring each group into said cradle, said transfer means also acting to discharge a group already in said cradle before positioning a new group therein, a chamber located adjacent said cradle and adapted to receive a said group for a vacuumizing and gassing operation, and means for moving said cradle relative to said chamber to position a said group of containers therein.

11. In a machine for treating filled containers, the combination of means for feeding said containers into groups each group containing a predetermined number, weight arms movable by each of the containers of a group for detecting the completeness of said group, a pair of chambers adapted to receive separate groups of containers for a vacuumizing and gassing operation, a movable cradle disposed between said chambers for successively receiving said groups, means for transferring each group into said cradle, means for moving said cradle alternately into sealing engagement with each of said chambers and at the same time positioning a said group of containers into said sealed chamber, and valve means actuated in time with the movement of said cradle for vacuumizing and gassing said alternately sealed chambers and the containers therein.

12. In a machine for treating filled containers, comprising in combination a plurality of chambers, a movable cradle disposed between said chambers and adapted to receive and carry groups of said containers, means for successively moving said cradle into sealing engagement with each of said chambers and at the same time positioning a group of said containers into said sealed chamber, vacuum valve means connected to one of said chambers and to a source of vacuum, gas valve means connected to another of said chambers and to a source of inert gas, said valve means being interconnected, and means for actuating said valve means for vacuumizing and gassing said sealed chamber and the containers therein in time with the movement of said cradle.

13. In a machine for treating filled containers, comprising in combination a plurality of chambers, a movable cradle disposed between said chambers and adapted to receive and carry groups of said containers, means for successively moving said cradle into sealing engagement with each of said chambers and at the same time positioning a group of said containers into said sealed chamber, valve means for vacuumizing and gassing said sealed chamber and the containers therein in time with the movement of said cradle, and means associated with said valve means for visibly indicating a condition of insufficient vacuum in a said sealed chamber.

14. In a machine for treating filled containers, comprising in combination a plurality of chambers, a movable cradle disposed between said chambers and adapted to receive and carry groups of said containers, means for successively moving said cradle into sealing engagement with each of said chambers and at the same time positioning a group of said containers into said sealed chamber, valve means for vacuumizing and gassing said sealed chamber and the containers therein in time with the movement of said cradle, and means associated with said valve means for visibly indicating a condition of insufficient gas in a said sealed chamber.

15. In a machine for treating filled containers, comprising in combination, a plurality of chambers, a movable cradle disposed between said chambers and adapted to receive and carry groups of said containers, means for successively moving said cradle into sealing engagement with each of said chambers and at the same time positioning a group of said containers into said sealed chamber, valve means for vacuumizing and gassing said sealed chamber and the containers therein in time with the movement of said cradle, and means associated with said valve means and actuated by the pressure in a said sealed chamber for cutting off the gas supply when said pressure reaches a predetermined value.

16. In a machine for treating filled containers, the combination of conveyor means for said containers, means associated with said conveyor means for collecting said containers into a group, means for detecting the presence of each container as it takes its place in said group, means associated with said detecting means and operable when a predetremined number of containers are present in said group for releasing said group for further movement, and means for exhausting air simultaneously from the containers of said group, and means for supplying gas to the exhausted containers.

17. In a machine for treating filled containers, the combination of means for conveying said containers, means associated with said conveyor means for collecting said containers into a group, means for detecting the presence of each container as it takes its place in said group, means associated with said detecting means and operable when a predetermined number of containers are present in said group for releasing it, and means for subsequently moving said group, said releasing means also setting in motion said last mentioned moving means.

18. In a machine for treating filled containers, the combination of means for conveying said containers, means associated with said conveyor means for collecting said containers into a group, means for detecting the presence of each container as it takes its place in said group, and means also operable by said detecting means for segregating said collected group of containers from other containers conveyed by said conveyor means.

NEILS P. BACH.